United States Patent [19]

Breuninger

[11] 4,345,948

[45] Aug. 24, 1982

[54] METHOD FOR DEWATERING STARCH SLURRIES CONTAINING SWOLLEN STARCH GRANULES

[75] Inventor: William F. Breuninger, Greenwood, Ind.

[73] Assignee: National Starch and Chemical Corporation, Bridgewater, N.J.

[21] Appl. No.: 282,353

[22] Filed: Jul. 13, 1981

[51] Int. Cl.$^3$ ............................................... C13L 1/08
[52] U.S. Cl. .................................... 127/70; 106/213; 127/69; 536/102
[58] Field of Search ...................... 127/34, 69, 70, 71; 525/375; 536/102; 106/213

[56] References Cited

U.S. PATENT DOCUMENTS

| | | | |
|---|---|---|---|
| 2,913,359 | 11/1959 | Pollock, Jr. | 127/71 |
| 3,273,790 | 9/1966 | Dahlberg | 127/69 X |
| 3,639,209 | 2/1972 | Buckman | 127/71 X |
| 3,912,715 | 10/1975 | Jarowenko | 536/102 |
| 3,930,877 | 1/1976 | Aitken | 106/213 X |
| 4,021,260 | 5/1977 | Crill | 106/213 |

OTHER PUBLICATIONS

Chemical Abstracts, 77:102275a (1972).

*Primary Examiner*—Sidney Marantz
*Attorney, Agent, or Firm*—Edwin M. Szala; Ellen T. Dec

[57] ABSTRACT

The production rate and yield resulting from the washing of starch conversion products containing swollen starch granules is improved by the addition to the wash water of 0.1 to 1% by weight, based on starch solids, of a cationic polymer which is a water-soluble acid salt of an aminoalkyl ester of a carboxylic acid polymer.

5 Claims, No Drawings

METHOD FOR DEWATERING STARCH SLURRIES CONTAINING SWOLLEN STARCH GRANULES

BACKGROUND OF THE INVENTION

This invention relates to an improvement in the processing of starch by the addition of specific cationic polymers to starch slurries containing swollen starch granules in order to improve the dewatering of the slurry and thereby increase production rate and yield.

When starch is derivatized with one or more reagents or degraded with acid or oxidizers or when it is exposed to alkali or subjected to a combination of these treatments, some of the granules become swollen or partially gelatinized. The presence of these swollen starch granules in the treated starch product reduces dewatering and drying rates and requires increased energy for drying. Moreover, when the treated starch is washed in a continuous centrifugal device such as a Merco the swollen starch granules are removed along with the reaction by-products due to their reduced density with respect to the intact granules. In these cases, while the processing rates are improved by the removal of some of the swollen starch, their removal reduces product yield and also contributes to increased effluent load.

Several synthetic polymers have been proposed as dewatering aids in washing such treated starch products however none to date have showed significant improvement in yields and processing rates when employed on a commercial scale.

It is therefore an object of the present invention to provide a method for washing treated starch containing swollen starch granules in order to maintain high processing rates without reducing the yield or increasing the effluent level.

SUMMARY OF THE INVENTION

I have found that the addition of 0.1 to 1% by weight, based on the treated starch solids, of a cationic polymer which is a water-soluble acid salt of an aminoalkyl ester of a carboxylic acid polymer substantially increases the processing rate and yield of the starch system during washing in a continuous centrifugal device such as a Merco while also reducing suspended solids in the effluent.

DETAILED DESCRIPTION OF THE PREFERRED EMBODIMENTS

Among the various cationic polymers useful in the practice of this invention are included the mineral acid salts of the amino-alkyl esters of homo- and copolymers of unsaturated carboxylic acids having from 3 to 5 carbon atoms, for example, acrylic acid, methacrylic acid, crotonic acid, ethacrylic acid, fumaric acid, maleic acid and itaconic acid, and the aminoalkyl groups containing from 2 to 6 carbon atoms. Useful aminoalkyl groups include, for example, aminoethyl, 2-aminopropyl and t-butyl aminoethyl, with the aminoethyl being preferred.

More specifically, the useful polymers include the salts of the aminoalkyl esters of (a) homopolymers of homopolymerizable unsaturated carboxylic acids having 3 to 5 carbon atoms; (b) copolymers of copolymerizable mixtures of said acids, and (c) copolymers formed of unsaturated carboxylic acids having 3 to 5 carbon atoms and at least one copolymerizable ethylenically unsaturated comonomer selected from the group consisting of vinyl acetate and vinyl propionate; vinyl methyl ether and vinyl ethyl ether; the $C_1$-$C_8$ alkyl half esters of maleic and fumaric acids, for example, diethyl fumarate, dioctyl fumarate, dibutyl maleate, dioctyl maleate, monobutyl maleate, monomethylfumarate, and monooctyl fumarate; amides of acrylic and methacrylic acids, for example, acrylamide, N-methyl acrylamide, and methacrylamide; and the $C_1$-$C_{18}$ alkyl and $C_2$-$C_4$ hydroxyalkyl esters of acrylic and methacrylic acids. Specific examples of the latter class includes methyl acrylate, ethyl acrylate, butyl acrylate, octyl acrylate, dodecyl acrylate, stearyl acrylate, hydroxyethyl acrylate, hydroxypropyl acrylate, as well as the corresponding methacrylate esters. Preferred comonomers include the amides and the $C_1$-$C_{18}$ alkyl and $C_2$-$C_4$ hydroxyalkyl esters of acrylic and methacrylic acids.

It will be recognized that, for the purposes of the present invention, the copolymeric mixture of copolymerizable carboxylic acids of group (b) may contain the various monomeric components in any proportion. However, in the case of the copolymers of group (c), there must be present at least 50 mole percent, and preferably 75 mole percent, of the unsaturated carboxylic acid component.

With regard to the preparation of cationic polymers useful in the practice of this invention, the practitioner will recognize that such materials may be commercially available or may normally be synthesized either (1) by polymerizing monomers which have the functional aminoalkyl ester groups attached or (2) by subsequently affixing said groups to a base polymer such as the homopolymer of an ethylenically unsaturated carboxylic acid or a copolymer formed with at least one ethylenically unsaturated carboxylic acid and one or more copolymerizable comonomers. For example, the first method would typically involve the homopolymerization of one of the following: t-butylaminoethyl methacrylate, dimethylaminoethyl methacrylate, or the copolymerization of any one of the foregoing compounds with one or more of the above mentioned copolymerizable comonomers. Such methods are disclosed in, inter/alia, Piloni, U.S. Pat. No. 2,979,491; P. L. deBenneville, U.S. Pat. No. 2,744,884; and in Mowry et al., U.S. Pat. No. 2,625,471. The second method wherein the functional aminoalkyl ester groups are affixed to the base polymer may be carried out according to the process taught in, inter alia, assignee's Fertig et al. U.S. Pat. No. 3,372,149, the disclosure of which is incorporated herein by reference. Regardless of the means of synthesis selected, a well known free radical polymerization procedure is usually entailed. These compounds, upon utilization in accordance with this invention, are all characterized by their ability to display the desirable dewatering properties when used in washing of starch slurries containing swollen starch granules. In accordance with the present invention, the cationic polymers described above are added directly to the starch slurry at levels of 0.1-1% by weight, preferably 0.2 to 0.6%. The amount of polymer used depends, in part, upon the particular conversion treatment to which the starch has been subjected as well as the composition of the specific cationic polymer employed.

Virtually any starch base treated with conventional conversion techniques results in the formation of some swollen granules and therefore will benefit from processing in accordance with the present invention. Thus, applicable starch materials which may be so processed are the conversion products derived from any plant source including corn, potato, sweet potato, wheat, rice, sago, tapioca, waxy maize, sorghum, high amylose corn or the like. Typical conversion products include, for example, oxidized starches prepared by treatment with oxidants such as sodium hypochlorite; fluidity or thin boiling starches prepared by enzyme conversion or by mild acid hydrolysis as well as derivatized starches such as starch ethers and esters. While it is recognized that the processing technique described herein is applicable to any of the above starches, it will be realized that use on starches which are to be employed in foodstuffs is not contemplated.

The most commonly employed continuous centrifugal washing device used in substantially all the commercial processing of starch conversion products is the Merco Centrifuge (available from Dorr-Oliver Inc., Stamford, Conn.). In utilizing this equipment to wash starch in accordance with the invention, the wash liquor moves inward against an outward movement of starch particles, efficiently stripping them of contaminating soluble material yet retaining the swollen starch granules within the system. When the swollen starch granules are thus retained with the starch being processed there is no increase in drying energy required while there is an improvement in processing rate and yield accompanied by a reduction in effluent load. These novel benefits of the processing technique of the present invention will be shown in the examples which follow.

EXAMPLE I

A commercially treated oxidized starch (4.8% chlorine on starch) was sampled after treatment and before final processing of washing, dewatering and drying. To 500 ml of slurry (containing 220 g of commercial starch) was added 0.25% (dry basis) of several cationic polymers. After 15 minutes of mixing, samples were poured into a settling cone. Settling was noted with respect to the hydrated sediment on top of the granular starch sediment. After 20 hours, supernatant liquid was carefully decanted and the upper layer of high hydrated sediment was examined under a microscope (480×).

| Sample | 5 hours | 20 hours |
|---|---|---|
| A. Control (no additive) | ⅜" sediment | Swollen starch granules |
| B. Nitrate salt of Poly(aminoethyl acrylate-hydroxypropyl acrylate) M.W. approx 200,000 | ⅛" sediment | Few swollen granules, a few also found in middle of starch sediment layer |
| C. Nitrate salt of Poly(aminoethyl acrylate-hydroxypropyl acrylate) M.W. approx 500,000 | ⅛" sediment | Few swollen starch granules |
| D. Nitrate salt of the aminoethyl ester of a terpolymer of acrylic acid, hydroxypropyl acrylate and acrylamide M.W. approx 500,000 | ⅛" sediment | Few swollen starch granules |

Twenty hour microscopy showed light "flocs" of material in every test including control, but only control showed a high concentration of swollen starch granules on the surface. In all cases where cationic polymers were used, supernatant clarity was better than control, especially in Sample B.

Using the same commercial oxidized starch, a similar experiment was carried out using variation in levels of the polymer used in Sample B above. Observation at 20 hours with respect to relative differences in sediment showed the control sample (no additive) to have the greatest volume of sediment with sediment decreasing as the polymer was added in increasing amounts of 0.13%, 0.32% and 0.64%.

EXAMPLE II

Three batches of commercially prepared acid modified starch were washed, dewatered and dried using the techniques described herein with the addition of 0.25% of the polymer used in Sample B to the wash water. In each case, controls were run without the addition of the polymer. The results are shown in the table below.

| | Rate (lb/hr) | Cake Moisture (%) | Suspended solids in sewer (ppm)** |
|---|---|---|---|
| Batch A | | | |
| with polymer | 9,017 | 40.1 | 1,220 |
| without polymer | 5,007* | 42.6 | 1,552 |
| Batch B | | | |
| with polymer | 16,760 | 40.1 | 5,306 |
| without polymer | 9,691 | 44.7 | 7,916 |
| Batch C | | | |
| with polymer | 16,290 | 41.4 | 3,236 |
| without polymer | 14,199 | 42.6 | 5,052 |

*This value is questionable; a "normal" rate for this product and equipment would have been about 8,000 lbs/hr.
**This test described at page 94 of "Standard Methods for the Examination of Water and Wastewater," 14th edition, American Public Health Publication, 1975.

While run-to-run variations are seen due to differences in the different types of drying systems used, the fact remains that when the runs are compared, the runs containing the polymeric additive are consistently superior as shown by better rates, lower moisture and lower sewer losses.

The ability to reduce cake moisture as demonstrated above contributes to improving dryer rates and also means less energy is required for actual drying. In "normal" processing, swollen starch granules will "coat" a starch cake and blind a filter cloth, just as they were concentrated on the surface of settling tests described in Example I. This reduces dewatering rate and hence reduces processing rate. By use of the additive, we have dewatered the starch while having the swollen granules present, distributed through the starch cake rather than concentrated on the surface of the centrifuge cake.

EXAMPLE III

To demonstrate the improved yield obtained using the processing technique of the present invention, two entire commercial runs were made using the starch and polymer described in Sample B of Example I. Three control runs were made without any polymer. The results are shown below.

| Run | Yield with 0.25% Polymer | Yield without polymer |
|---|---|---|
| A | 96.3 | — |

-continued

| Run | Yield with 0.25% Polymer | Yield without polymer |
| --- | --- | --- |
| B | 95.0 | — |
| C | — | 91.6 |
| D | — | 88.5 |
| E | — | 84.8 |

Summarizing, it is seen that the addition of minor amounts of specific cationic polymers to the wash water substantially improves the processing rate and yield of starch conversion products containing swollen starch granules when the products are washed in continuous centrifugal devices.

Variations may be made in the proportions, procedures, and materials without departing from the scope of this invention which is defined by the following claims.

What is claimed is:

1. In a process for the washing of starch conversion products containing swollen starch granules in a continuous centrifugal device, the improvement which comprises adding to the starch slurry 0.1 to 1%, based on weight of starch solids, of a cationic polymer which is a water-soluble acid salt of an aminoalkyl ester of a carboxylic acid polymer thereby increasing the production rate and yield while reducing suspended solids in the effluent.

2. The process of claim 1 wherein the carboxylic acid is selected from the group consisting of aminoalkyl esters of (a) a homopolymer of a homopolymerizable unsaturated carboxylic acid having 3 to 5 carbon atoms, (b) a copolymer of a copolymerizable mixture of unsaturated carboxylic acids having 3 to 5 carbon atoms, and (c) a copolymer of at least one of said acids having 3 to 5 carbon atoms and at least one copolymerizable ethylenically unsaturated comonomer selected from the group consisting of vinyl acetate, vinyl propionate, vinyl methyl ether, vinyl ethyl ether, the $C_1$–$C_{18}$ alkyl half esters of maleic and fumaric acids, amides of acrylic and methacrylic acids and the $C_1$–$C_{18}$ alkyl and $C_2$–$C_4$ hydroxyalkyl esters of acrylic and methacrylic acids, wherein the copolymers of group (c) are prepared with at least 50 mole percent of the unsaturated carboxylic acid component.

3. The process of claim 1 wherein the water-soluble acid salt of a carboxylic acid polymer is the nitrate salt of the aminoethyl ester of a terpolymer of acrylic acid, hydroxypropyl acrylate, and acrylamide.

4. The process of claim 1 wherein the water-soluble acid salt of a carboxylic acid is the nitrate salt of poly(aminoethyl acrylate-hydroxypropyl acrylate).

5. The process of claim 1 wherein the water-soluble acid salt of a carboxylic acid polymer is added in an amount of 0.2 to 0.6%.

* * * * *